Dec. 5, 1933.   J. W. FRENCH   1,937,818
ADJUSTABLE WASHER
Filed May 7, 1930
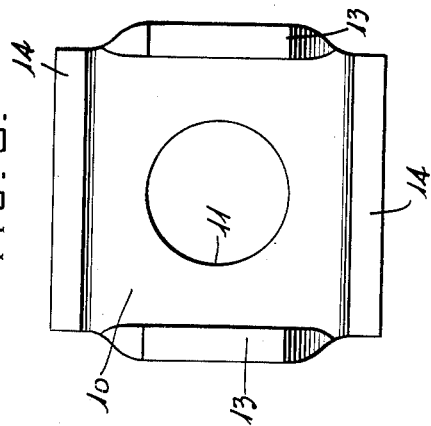
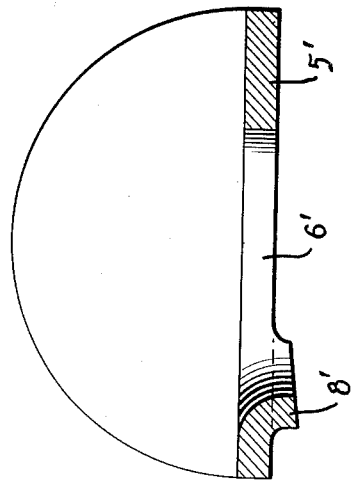
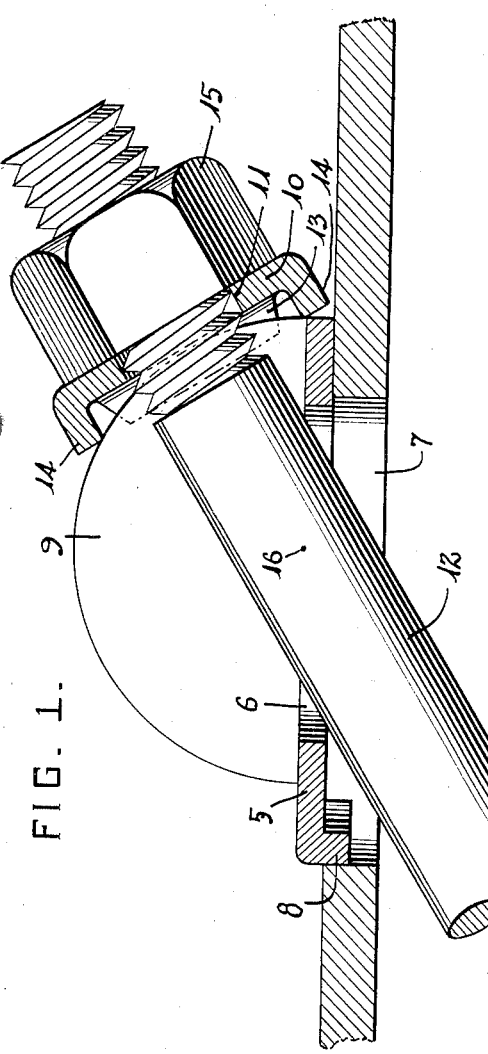
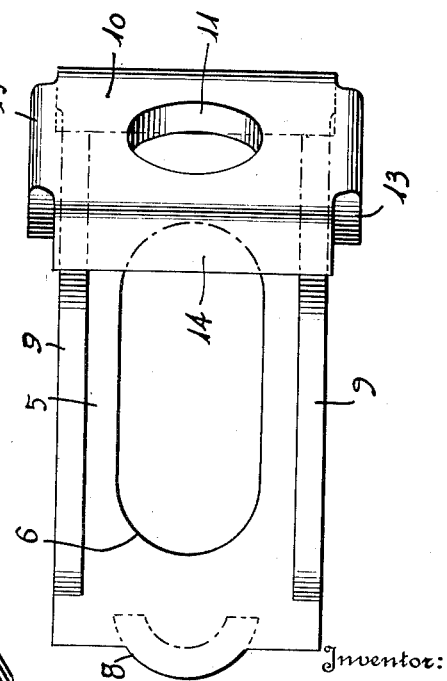

Patented Dec. 5, 1933

1,937,818

UNITED STATES PATENT OFFICE 1,937,818

ADJUSTABLE WASHER

John W. French, Warren, Ohio, assignor to The General Pressed Steel Company, Newton Falls, Ohio, a corporation of Ohio Application May 7, 1930. Serial No. 450,453

2 Claims. (Cl. 85—50)

The present invention relates to washers adapted for use on bolts or tie or cross rods used in structural iron buildings, concrete forms, and the like, wherein the bolt or rod may be disposed at each different angle to the building or form member or other part.

It is the object of the invention to provide a novel and improved adjustable washer for use on a bolt or rod which may be disposed at different angles with reference to a member or part through which the bolt or rod extends, in order that the washer may be adjusted for different angular relations of the parts, thereby eliminating the use of bevel washers of different angular forms or degrees such as commonly used, and requiring a special washer for each angle between the bolt or rod and the object through which it extends.

Another object of the invention is the provision of a washer of the kind indicated which may be conveniently pressed from sheet metal, for economical manufacture, and comprising a novel assembly of the component elements to render the washer practical and efficient in use.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is a median section of the washer, showing the bolt or rod in elevation and in its extreme adjustment.

Fig. 2 is an elevation of the washer, with the parts in the same relation as shown in Fig. 1, the bolt or rod being omitted.

Fig. 3 is a plan view of one part or member of the washer.

Fig. 4 is a median section of the other part or member of the washer, with a modification.

The washer is composed of two parts or members which are conveniently pressed from sheet or plate metal of suitable thickness, either hot or cold pressed.

One member comprises a base plate 5 having the slot 6 to register with a slot 7 in the member of a structural iron building, concrete form, or other structure, and said plate has a lip or arcuate abutment 8 pressed to one side at one end beyond the slot 6 to enter the slot 7 and abut against one end of said slot 7 to resist the movement of the plate 5 in the corresponding direction.

The plate 5 is provided with outstanding wings 9 at that side opposite to the lip or abutment 8, and said wings are disposed at opposite sides of the slot 6. The wings 9 have semi-circular convex edges for the contact of the other member or part of the washer.

The second member of the washer comprises a washer plate 10 seatable against the arcuate edges of the wings 9 and having an aperture 11 through which the rod or bolt 12 extends, said rod or bolt passing through the slots 6 and 7, as seen in Fig. 1. The plate 10 has opposite flanges 13 overlapping the outer sides of the wings 9 to prevent lateral movement of the plate 10 across the edges of said wings, and said plate 10 has other opposite flanges 14 bent in the same direction as and arranged at right angles with the flanges 13, which flanges 14 are seatable against the edges of the wings 9 across which said flanges extend.

The nut 15 threaded on the bolt or rod 12 is seatable against the washer plate 10, as seen in Fig. 1, and it is apparent that the plate 10 may be adjusted along the edges of the wings 9, with the rod or bolt, about the center 16 of the curved edges of said wings. This permits the washer to be used with the rod or bolt at right angles to the object or member through which it extends, and for angles less than ninety degrees down to about twenty-nine degrees, as seen in Fig. 1.

Fig. 4 illustrates a modification in the base plate 5', in that the lip or abutment 8' is located at one end of the slot 6'.

Having thus described the invention, what is claimed as new is:

1. A washer of the kind described comprising a flat member seatable against a flat surface and having a slot for a bolt or rod and having opposite outstanding integral parallel wings at opposite sides of said slot and provided with curved edges, and a washer plate having an aperture for said bolt or rod and being bent to form flanges adapted to extend across and seat against said curved edges of the wings, said washer plate having other flanges adapted to overlap the outer sides of said wings.

2. A washer of the kind described, comprising a flat member seatable against a flat surface and having a slot for a bolt or rod and having opposite outstanding integral parallel wings at opposite sides of said slots, and provided with curved edges, and a washer plate having an aperture for said bolt or rod and being bent to form a pair of opposite flanges adapted to overlap the outer sides of said wings whereby to guide said washer plate and a second pair of flanges oppositely arranged at right angles to the first mentioned flanges, said second pair of flanges seatable against the edges of the parallel wings.

JOHN W. FRENCH.